April 18, 1950   C. W. FREEMAN   2,504,318
DISPLAY APPARATUS
Filed Feb. 21, 1947   2 Sheets-Sheet 1
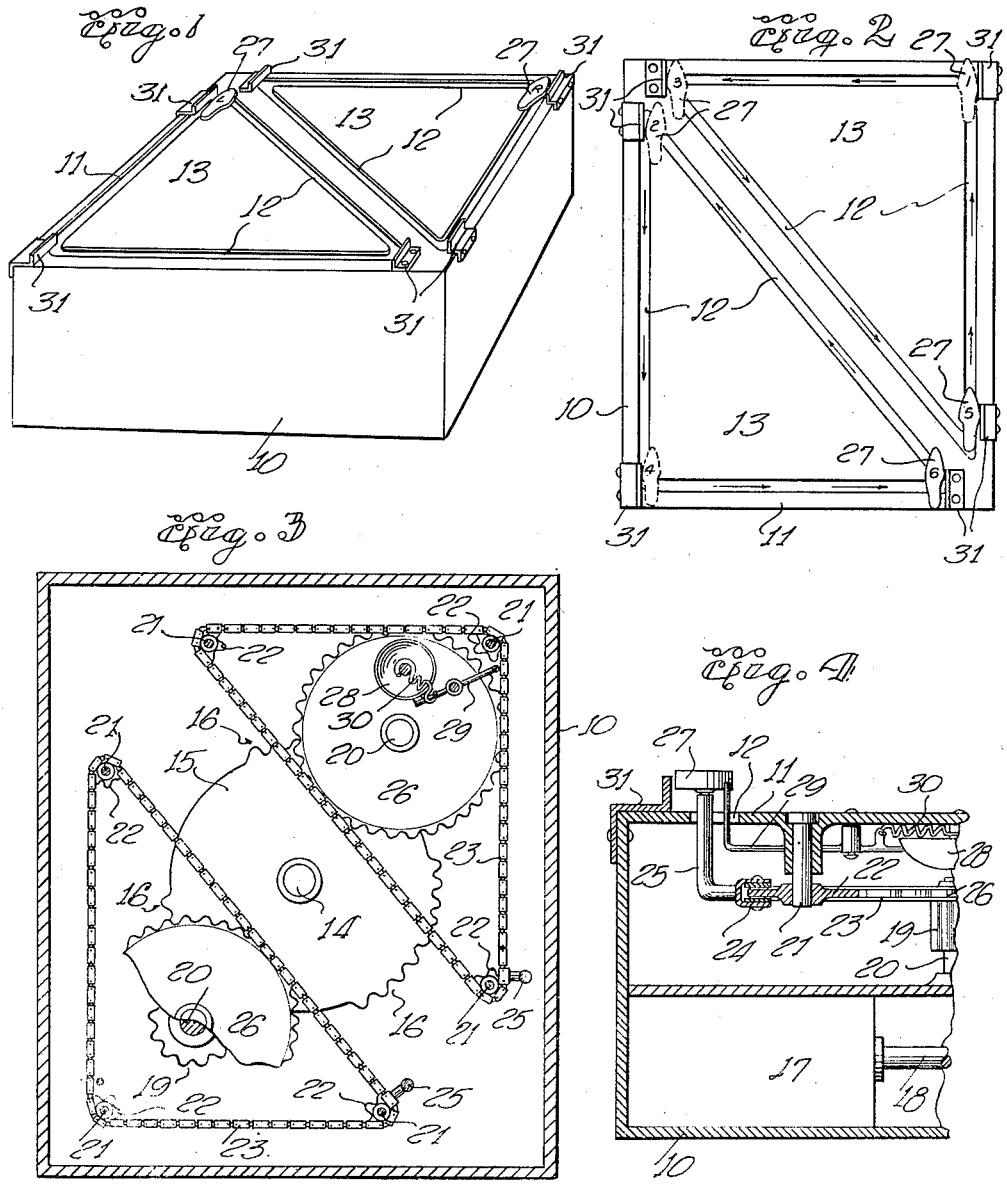
INVENTOR.
CLAUD W. FREEMAN
ATTORNEY April 18, 1950     C. W. FREEMAN     2,504,318
DISPLAY APPARATUS
Filed Feb. 21, 1947     2 Sheets-Sheet 2
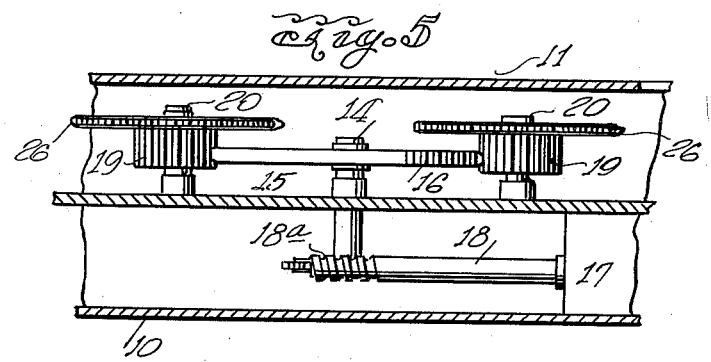
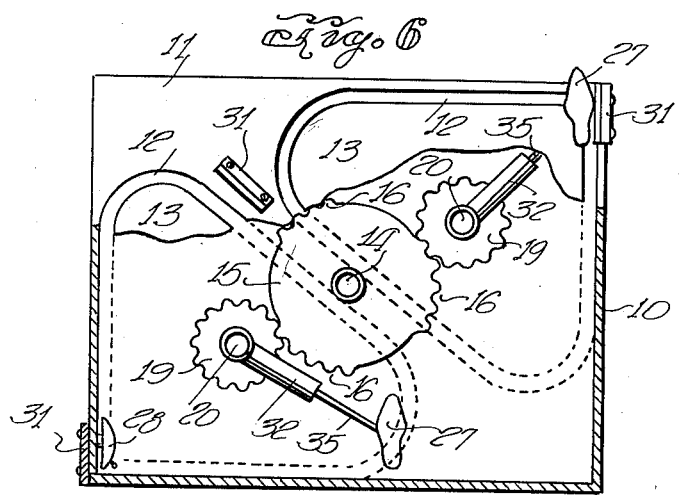
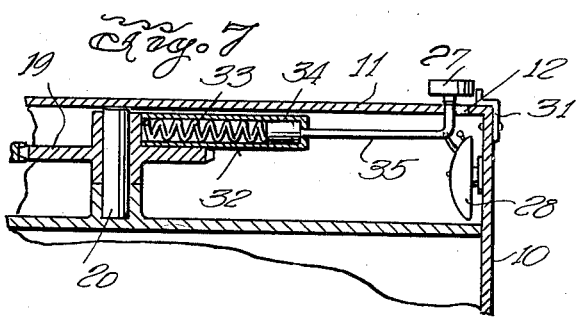
INVENTOR.
Claud W. Freeman
ATTORNEY Patented Apr. 18, 1950

2,504,318

UNITED STATES PATENT OFFICE 2,504,318

DISPLAY APPARATUS

Claud W. Freeman, Fort Worth, Tex.

Application February 21, 1947, Serial No. 730,091

3 Claims. (Cl. 35—29)

This invention relates to mechanical display devices and more particularly to apparatus for exhibiting dance steps for educational, advertising and other purposes.

The principal object of the invention is to provide an automatic display device which is at once a medium for training a novice in the art of dancing and a display device finding usefulness in advertising various services and merchandise such as schools of dance, phonograph records and the like.

Another object of the invention is to provide a novel mechanism consisting of a housing, in the top of which is formed one or more slots of unbroken continuity defining areas of triangular or circular shapes and through which slots protrude pins carried by chains, belts or arms, each or all of which are actuated by mechanism in the housing for causing the pins to follow said slots. By virtue of objects attached to the pins, such as simulated shoe soles or superimposed figures in a dancing pose, animation of these objects attracts attention of a sort calculated to afford amusement or to instruct one in the performance of certain dance steps.

With the foregoing and other objects in view the invention has further reference to certain features of accomplishment which will become apparent as the description proceeds, taken in connection with the accompanying drawings wherein:

Figure 1 is a perspective view of the housing of a device constructed according to the invention.

Figure 2 is a top plan view thereof.

Figure 3 is a plan view of the housing with the top removed to show the mechanism therein.

Figure 4 is a fragmentary side elevational view, with parts in vertical section.

Figure 5 is a fragmentary side elevational view, partly in section of a modified form of the invention.

Figure 6 is a plan view of the housing of the modified form of the invention, with parts of the top cut away.

Figure 7 is a fragmentary sectional view on a slightly enlarged scale.

Continuing with a more detailed description of the drawings, reference is primarily made to Figures 1 to 5 inclusive wherein 10 denotes a housing of any suitable external shape, having a flat top 11. The top 11 has two continuous slots 12 therein, each defining a triangular area 13 whose longest sides are confronting.

Centrally disposed in the housing 10 is a vertical shaft 14 on which is mounted a gear 15 whose teeth are arranged in peripheral segments 16. The gear 15 is caused to revolve by a motor 17 and a shaft 18 and conventional worm gearing, 18a (Figure 5) which rotates the center shaft 14. As the gear 15 revolves, the toothed segments 16 come into successive engagement with pinions 19, mounted on individual shafts 20, such engagement between the segments 16 and pinions 19 being alternate for purposes to be explained presently.

Triangularly spaced within the housing 10 but shown as depending from the tops 11 thereof are stub shafts 21, each of which carries a sprocket wheel 22. A chain 23 surrounds each triangular group of sprocket wheels, the leads of the chains lying immediately below the slots 12 in the top 11 of the housing.

Attached in spaced relationship to the chains 23 by means of clevises 24 are L-shaped pins 25, the latter being turned upwardly to extend through the slots 12 of the top 11. To operate the chains 23 through the sprocket assembly described, a gear 26 is mounted on each of the shafts 20 immediately above the pinions 19, each such sprocket being disposed within the confines of its respective chain which it drives by engagement of its teeth with one lead thereof.

Mounted on each of the pins 25 of which there are two, is an object 27, simulating the sole of a foot or shoe and representing the right and left foot.

In operation, the motor 17 effects rotation of the segmental gear 15 causing its segments 16 to be brought into mesh with one and then the other of the pinions 19. The resulting action will be that the sprocket 26 will cause the chains 23 to move alternately, displacing the pins 25 in the slots 12 and consequently moving the simulated feet 27, the degree of such movement being determined by the number of teeth in each segment 16 of the gear 15.

It is the purpose of the described arrangement to move first one foot member 27 and then the other to cause them to simulate steps in dancing. For example, the foot at the right in Figure 2 will first be moved from position "1" to position "3" at which latter position there is a pause, occasioned by the gear segment 16 passing off the pinion 19 which operates this particular foot. Another gear segment will then engage the companion pinion 19, whereupon the left foot will be moved from position "2" to position "4." There is a pause while the right foot moves from position "3" to position "5," following which the left foot is brought from position "4" to position "6."

The position of the feet 27 as shown in solid lines in Figure 2 is the starting position from which the foregoing steps may be said to originate but it is obvious that there are no restrictions other than the limitations presented by the slots 12 and operating means of the "feet" as to the movement of the latter.

While only one is shown, there are three audible signals for the operating range of each foot 27. The signal may be in the form of a bell 28 having a striker arm 29 which extends outwardly and upwardly through the slot 12 in the path of the foot member 27. As each foot member reaches the end of each period of travel, it engages an arm 29, displacing the same against the displacement of a spring 30, the latter compelling the striking end of the arm against the bell.

In order that the "feet" 27 will remain in the same plane as they travel about the triangular area 13, plates 31 are arranged at each return angle of the triangle against which the "feet" are brought, causing them to be oriented properly into their original plane.

Referring now to Figures 6 and 7 inclusive, the same result described in the foregoing is sought but is accomplished in a slightly different manner. In this form of the invention the same characters are used to identify corresponding parts in Figures 1 to 4 inclusive but unrelated parts will bear new references.

The housing 10 has in its top 11, continuous slots 12 defining substantially triangular areas 13. A center shaft 14 is disposed in the housing and a segmental gear 15 is mounted on the shaft 14 having segments 16 of predetermined length and spacing.

A motor 17 drives a shaft 18, the latter in turn, rotating the center shaft 14 through suitable gearing 18a. Rotation of the shaft 14 causes the gear 15 to revolve, bringing the gear segments 16 thereof into periodic and alternate engagement with pinions 19 disposed diametrically opposite on each side of the gear 15 to effect intermittent and alternate rotation of these pinions.

Attached to the shafts 20 at each end is a tubular member 32, against which bears a plunger 34, an arm 35 extends outwardly from the plunger whose outer end is turned upwardly through a slot 12. A simulated foot 27 is attached to the vertical portion of the arm 35 and, by virtue of the orienting plates 31 at each angle of the triangular area 13, the "feet" 27 are caused to maintain their original planes as they pass around the said areas 13.

As in the preceding instance, the segmental gear 15 causes the pinions to revolve intermittently and at each partial revolution which occurs alternately between the pinions, the arms 35 are constrained to follow the slots 12 and in so doing, move the "feet" 27. The "feet" 27, whose displacement is determined by the length and spacing of the toothed segments of the gear 15, are caused to assume positions of certain steps in dancing for purposes of instruction or in the case of advertising display, to attract attention. Also, as in the preceding instance, signals 28 are disposed at each angle of the triangular areas 13 to denote the termination of movement of the "feet" in proper sequence.

Manifestly, the construction as shown and described is capable of some modification and such modification as may be construed to fall within the scope and meaning of the appended claims is also considered to be within the spirit and intent of the invention.

What is claimed is:

1. A display apparatus including a housing having a top provided with continuous slots defining separate areas of predetermined shape, a vertical shaft disposed centrally in said housing, a gear on said shaft having circumferentially spaced groups of gear teeth, a stub shaft disposed within each of the areas defined by said slots, a pinion on each of said stub shafts with which the groups of teeth of said gear alternately engage to effect intermittent rotation thereof, a large sprocket on each of said stub shafts, a group of small sprockets spaced about each of said latter sprockets, a chain on each group of sprockets underlying each of said slots and driven by said large sprocket, a pin carried by each of said chains and extending through a respective slot in said housing top and display means carried by each of said pins and alternately actuated thereby to exemplify a pattern of dance steps.

2. Display apparatus for exemplifying steps in dancing, comprising a housing having a top provided with continuous slots defining separate areas of a predetermined shape, a flexible element below and in register with each of said slots, a pin on each flexible element and extending through a slot, a display object carried by each pin and adapted to be alternately moved to simulate dance steps, means for actuating each of said flexible elements, said means comprising a gear having circumferentially spaced gear teeth, a pinion intermittently rotated by said gear and means operated by said pinion for imparting intermittent motion to said flexible element.

3. Display apparatus for exemplifying dance steps comprising a housing having a top having continuous slots defining separate areas of a predetermined shape, display means extending through said slots and adapted to be intermittently and alternately moved to simulate steps in dancing, means for actuating said latter means comprising a segmental gear disposed centrally in said housing, a pinion within the confines of each of said slots and engageable by the teeth of said gear to effect intermittent and alternate rotation of said pinions and means for transmitting the motion of said pinions to said display means.

CLAUD W. FREEMAN.

REFERENCES CITED

The following references are of record in the file of this patent:

UNITED STATES PATENTS

| Number | Name | Date |
|--------|------|------|
| 692,604 | Bourke | Feb. 4, 1902 |
| 721,806 | James | Mar. 3, 1903 |
| 1,090,207 | Hardin | Mar. 17, 1914 |
| 1,539,351 | Deardurff | May 26, 1925 |
| 1,836,233 | Ferris | Dec. 15, 1931 |